United States Patent Office 3,557,293
Patented Jan. 19, 1971

3,557,293
METHOD OF REPELLING INSECTS WITH AMINO-ALDEHYDES
Philip Kashin, Chicago, and Warner M. Linfield, Evanston, Ill., assignors to IIT Research Institute, Chicago, Ill., a not-for-profit corporation of Illinois
No Drawing. Continuation-in-part of abandoned application Ser. No. 660,918, Aug. 16, 1967. This application May 19, 1969, Ser. No. 825,939
Int. Cl. A01n 9/20
U.S. Cl. 424—325         9 Claims

ABSTRACT OF THE DISCLOSURE

An insect repellent containing an organic compound which is believed to operate via neuroinhibition and a liquid carrier which is a solvent for the compound. The compound is an amino-aldehyde having a carbon chain not longer than 15 carbon atoms, acyclic or carbocyclic, saturated or unsaturated, substituted or unsubstituted. Specific examples include 2-amino-benzaldehyde, 4-aminobutyraldehyde, aminoacetaldehyde and (diethylamino) acetaldehyde.

---

This application is a continuation-in-part of application Ser. No. 660,918, filed Aug. 16, 1967, now abandoned.

This invention relates to insect repellents and more particularly to mosquito repellents.

Although many insect repellents have been developed through the years, the search goes on for more effective and less expensive insect repellents. Improved repellents for mosquitoes and other insects are desired, and particularly desired is an insect repellent that is effective when taken internally.

It is an object of the present invention to provide improved insect repellents. Another object is to provide improved methods of repelling mosquitoes which have advantages over those in the prior art. A further object is to provide insect repellents that have a prolonged duration of effectiveness in repelling flying insects, such as mosquitoes. These and other objects of the invention should be apparent from a reading of the following detailed description including illustrative examples of various embodiments of the invention.

It has been found that a certain class of organic compounds interferes with the host-seeking behavior of mosquitoes. The class of organic compounds which as proved effective in this manner as a mosquito repellent is generally characterized by an aldehyde group which is attached to a carbon chain to which chain there is also attached at least one amino or substituted amino group. It is believed that neuroinhibition is the mechanism of action of these repellents, and that neuroinhibition is due to the presence, in a single molecule, of the combination of a relatively electrophilic center, such as the carbonyl moiety of an aldehyde group, and the relatively nucleophilic center, such as an amino group.

The effective organic compounds fall into a genus characterized by the formula RCHO wherein R is an acyclic or carbocyclic carbon chain which includes at least one amino group. If the carbon chain is a straight chain, the electrophilic group is preferably located at one end thereof. However, the electrophilic group can be located elsewhere, as on a branch of the chain or, if the chain is carbocyclic, the aldehyde or electrophilic group may be located on the ring.

It is considered that the aldehyde or electrophilic group should be attached to a carbon chain having not greater than fifteen carbon atoms to assure the compound will have sufficient volatility. The physical characteristics of the resultant compounds will of course vary with length of carbon chain, with the degree of unsaturation thereof and with any substituents thereon. It may be preferable to limit the length of the carbon chain to about six carbon atoms or less in order to generally assure that the compound has a sufficiently high vapor pressure. If the vapor pressure of the compound should be too low, it may conceivably detract from the effectiveness of an otherwise effective compound.

The carbon chain may be either saturated or unsaturated, and, if carbocyclic, it may be an aromatic. Because of the generally higher vapor pressures exhibited by carbon chains having some double bonds, it may be possible to utilize longer carbon chains when some degree of unsaturation is contained. The double bond in the carbon chain is also considered to be another electron-rich or nucleophilic moiety, and may therefore be considered to complement the electrophilic center provided by a group such as an aldehyde or alcohol.

The carbon chain may be unsubstituted, or its hydrogen atoms may be substituted for by elements or groups other than metals. Generally, substitution made on the carbon chain would be made by relatively short alkyl groups, such as methyl and ethyl groups. An amino group may itself also be substituted, that is, a secondary or tertiary amino group. For example, diethylamino derivatives of acetaldehyde, propionaldehyde or butyraldehyde are considered to provide effective insect repellency. Although compounds having a single amino group exhibit the desired repellency, compounds having more than one amino group may be used.

It has also been found that some of these amino-aldehydes are most effective as insect repellents when they are maintained at about a neutral pH, i.e., between about pH 6 and about pH 8. In general, any suitable buffering or neutralizing agents may be used to adjust to approximate neutrality the pH of a compound which exhibits substantial acidic or basic tendencies. For example, sodium bicarbonate is often employed to neutralize an acidic condition. Other of the amino-aldehyde compounds of interest do not show significant dependence upon pH for effectiveness, and solutions of such compounds are generally employed at a convenient pH which is compatible with human skin.

Within the larger genus of compounds RCHO herein described, a subgenus has proved to be very effective in repelling insects. In this subgenus, R is a carbon chain up to six carbon atoms in length, is either acyclic or aromatic, and has at least one amino group attached thereto. The hydrogen atoms in the amino group and/or on the carbon chain may be substituted by methyl or ethyl groups.

In the case where the carbon chain is a benzene ring, the amino group may be in the meta position, but is preferably in the ortho position, i.e., 2-aminobenzaldehyde. The other four carbon atoms on the benzene ring may have methyl or ethyl groups substituted for the hydrogen atoms thereon, for example, 2-amino-4-methylbenzaldehyde. Likewise, the amino group may be a secondary or tertiary amino group, for example, 2-(methyl ethylamino) benzaldehyde. Moreover, two amino groups may be present, i.e., 2,5-diaminobenzaldehyde.

When the carbon chain is acyclic, although the amino group may be attached to a carbon atom in the middle of the carbon chain, the amino group is preferably located at one end of the chain, with the aldehyde group located at the other end, for example, aminoacetaldehyde, 3-aminopropionaldehyde and 4-aminobutyraldehyde. As indicated above, the amino group may contain methyl and/or ethyl substitutions, for example, (methylethylamino) acetaldehyde. Likewise, the carbon chain may be branched, with methyl or ethyl groups being attached to the carbon atoms in the chain separating the amino and aldehyde groups, e.g., 3-amino-2-methylpropionaldehyde.

Although 4-aminobutyraldehyde is considered one of the most effective compounds of this subgenus, it is considered to be somewhat unstable chemically. It is believed to exhibit different forms at different pH ranges, and it is also subject to oxidation. Accordingly, this compound is usually prepared in the form of an acetal thereof, which is then hydrolyzed under acid conditions. Normally an acetal is prepared which is a derivative of methyl and/or ethyl alcohol. Moreover, it is also believed effective to apply the acetal topically to the skin under conditions where sweat would be normally present thereon, and thus allow the hydrolysis of the acetal to 4-aminobutyraldehyde and methyl or ethyl alcohol to take place on the surface of the skin.

It is important that an insect repellent be relatively inexpensive to use, and thus it should be effective when applied to human skin in low concentrations. Compounds of the type described are considered to be adequately effective if they are significantly repellent when applied to the skin at a level of about 0.1 milligram (mg.) or less per square inch of skin. Usually, these compounds will be applied topically at levels of at least about 0.01 mg./sq. in. It is well within the skill of the art to determine, for any particular compound, whether there is some upper limit of concentration beyond which that particular compound begins to decrease in its effectiveness, and this relatively easily determined value is termed, for purposes of this application, "an upper repellent limit." Although theoretically an insect repellent may be applied at levels up to such an upper repellent limit, from a practical standpoint, it is unlikely that the compounds of interest would be used at levels greater than about 10 mg./sq. in., and from a commercial standpoint, they would generally not be employed at levels above about 1 mg./sq. in.

Because the levels of magnitude at which the organic compounds will be employed are relatively low, it is considered that they would be employed with a suitable carrier, likely as a solution in a suitable solvent for the organic compound, which solvent is nontoxic to the human skin. Many of the amino-aldehydes of this general group are water-soluble, and accordingly they are usually employed as an aqueous solution which can be conveniently rubbed onto the skin. Such an aqueous solution can be easily buffered or neutralized to a desired pH range. If a particular organic compound is not sufficiently employed as an aqueous solution which can be compound is employed, such as an alcohol. The concentration at which the organic compound is present in the carrier is dependent somewhat upon the prospective method of application. Dependent upon the considerations discussed in the foregoing paragraph, the organic compound might be employed at a concentration up to its solubility limit in the carrier. However, considering the relatively low magnitudes at which the repellent need be topically applied, it might be employed at levels as low as about 1 mg., or even 0.1 mg. per cc. of carrier for a solution to be rubbed onto the skin, depending upon the specific compound. The concentrations might correspondingly vary if the compound is dissolved in a propellent in an aerosol can, or used with a roll-on applicator or in a solid solution in a stick form.

The following examples illustrate the best modes presently contemplated for carrying out the invention. However it should be clearly understood that these examples are merely illustrative of various embodiments of the invention and are not to be considered limitations of the invention which is defined solely by the claims appearing at the end of this specification.

EXAMPLE I 2-aminobenzaldehyde is obtained commercially and is dissolved in acetone to provide a solution containing about 0.2 mg. per cc. of solution. The solution is tested by application onto the skin of a mouse. About 0.5 cc. of the solution is applied to a one square inch area of the mouse. After evaporation of the solvent, there remains about 0.1 mg. of the organic compound. Testing is carried out by exposing the mouse to *A. aegypti* mosquitoes for a sufficient time to test the effectiveness. The organic compound is considered to be a very effective mosquito repellent.

EXAMPLE II 4-aminobutyraldehyde is prepared by hydrolyzing 4-aminobutyraldehyde diethylacetal with concentrated hydrochloric acid for 3 minutes at 100° C. under reflux in an inert atmosphere. The resultant product shows characteristic carbonyl absorption in the ultraviolet region (264 m$\mu$) and is believed to be 4-aminobutyraldehyde. The solution is neutralized with sodium carbonate to a pH of about 7. The resultant product is dissolved in acetone to a concentration of about 0.02 mg. per cc. of solution.

Testing is carried out as in Example I by applying 0.5 cc. of the solution to one square inch of the surface area of a mouse which provides about 0.01 mg. of the organic compound. As a result of testing, the organic compound is considered to be a very effective mosquito-repellent.

EXAMPLE III 4-aminobutyraldehyde is prepared by dissolving commercially available 4-aminobutyraldehyde diethylacetal in acetone to make a final solution containing 1.0 mg./cc., and treating each 20 cc. of solution with 0.1 cc. of 1 Molar HCl. The treated solution is left overnight under refrigeration at about 4° C. The resultant product, which is believed to be 4-aminobutyraldehyde, has a concentration of about 1 mg. per cc. The solution is diluted with acetone to a concentration of about 0.02 mg. per cc.

Testing is carried out as in Example I by applying 0.5 cc. of the solution to one square inch of the surface area which provides about 0.01 mg. of the organic compound. As a result of testing, the organic compound is considered to be a very effective mosquito-repellent.

EXAMPLE IV (Diethylamino) acetaldehyde is prepared by dissolving commercially available 1-diethoxy-2-diethyl-amino ethane in acetone to make a final solution containing 1.0 mg./cc., and treating each 20 cc. of solution with 0.1 cc. of 1 Molar HCl. The treated solution is left overnight under refrigeration at about 4° C. The resultant product, which is believed to be (diethylamino) acetaldehyde, has a concentration of about 1 mg. per cc. The solution is diluted with acetone to a concentration of about 0.2 mg. per cc.

Testing is carried out as in Example I by applying 0.5 cc. of the solution to one square inch of surface area of a mouse which provides about 0.1 mg. of the organic compound. As a result of testing, the organic compound is considered to be an effective mosquito-repellent.

EXAMPLE V

Aminoacetaldehyde is prepared by dissolving commercially available 1-dimethoxy-2-amino ethane in acetone and treating with 0.1 cc. of I Molar HCl per 20 cc. of solution. The treated solution is refrigerated overnight at about 4° C. The resultant product, which is believed to be aminoacetaldehyde, has a concentration of about 1 mg. per cc. and is diluted with acetone to a concentration of about 0.2 mg. per cc.

Testing is carried out as in Example I by applying about 0.5 cc. of the solution to one square inch of surface area of a mouse, which provides about 0.1 mg. of the organic compound. As a result of testing, the organic Various features of the invention are set forth in the following claims.

What is claimed is:

1. A method of repelling mosquitoes comprising applying to skin to be protected a repellent amount of an organic compound which is a primary, secondary or tertiary amino derivative of acetaldehyde, propionaldehyde or butyraldehyde, any substituents on the amino group being methyl or ethyl, said compound being applied at a level of at least about .01 mg./sq. in. and not greater than about 10 mg./sq. in.

2. The method in accordance with claim 1 wherein said organic compound is (diethylamino)acetaldehyde.

3. The method in accordance with claim 1 wherein said organic compound is aminoacetaldehyde.

4. The method in accordance with claim 1 wherein said organic compound is 4-aminobutyraldehyde.

5. The method in accordance with claim 4 wherein said organic compound is dissolved in a carrier substance which is chemically compatible with the human body, and wherein said solution has a pH between about 6 and about 8.

6. The method in accordance with claim 1 wherein said amino group is located at one end of the carbon chain and the aldehyde group is located at the other end.

7. A method of repelling mosquitoes comprising applying to skin to be protected a repellent amount of an organic compound selected from the group consisting of 2-aminobenzaldehyde, 3-aminobenzaldehyde, 2-amino-4-methylbenzaldehyde, 2-(methylethylamino)benzaldehyde, and 2,5-diaminobenzaldehyde, said compound being applied at a level of at least about .01 mg./sq. in. and not greater than about 10 mg./sq. in.

8. The method in accordance with claim 7 wherein said organic compound is 2-aminobenzaldehyde.

9. A method of repelling mosquitoes comprising applying to the skin to be protected a methyl or ethyl acetal of 4-aminobutyraldehyde which possesses insert repellency, said acetal being applied at a level of at least about 0.1 mg./sq. in. and not greater than about 10 mg./sq. in.

References Cited

UNITED STATES PATENTS

| | | | |
|---|---|---|---|
| 2,228,039 | 1/1941 | Van Peski et al. | 260—577 |
| 2,247,569 | 7/1941 | Brunken et al. | 95—7 |
| 2,267,277 | 12/1941 | Houk et al. | 91—70 |

OTHER REFERENCES

Chemical Abstracts, vol. 20 (1926), p. 3745.
Chemical Abstracts, vol. 55 (1961), p. 1417.

ALBERT T. MEYERS, Primary Examiner

F. E. WADDELL, Assistant Examiner

U.S. Cl. X.R.

424—330